WOODWORTH & WETHERED.
Ore Amalgamator.
No. 30,781. Patented Nov. 27, 1860.
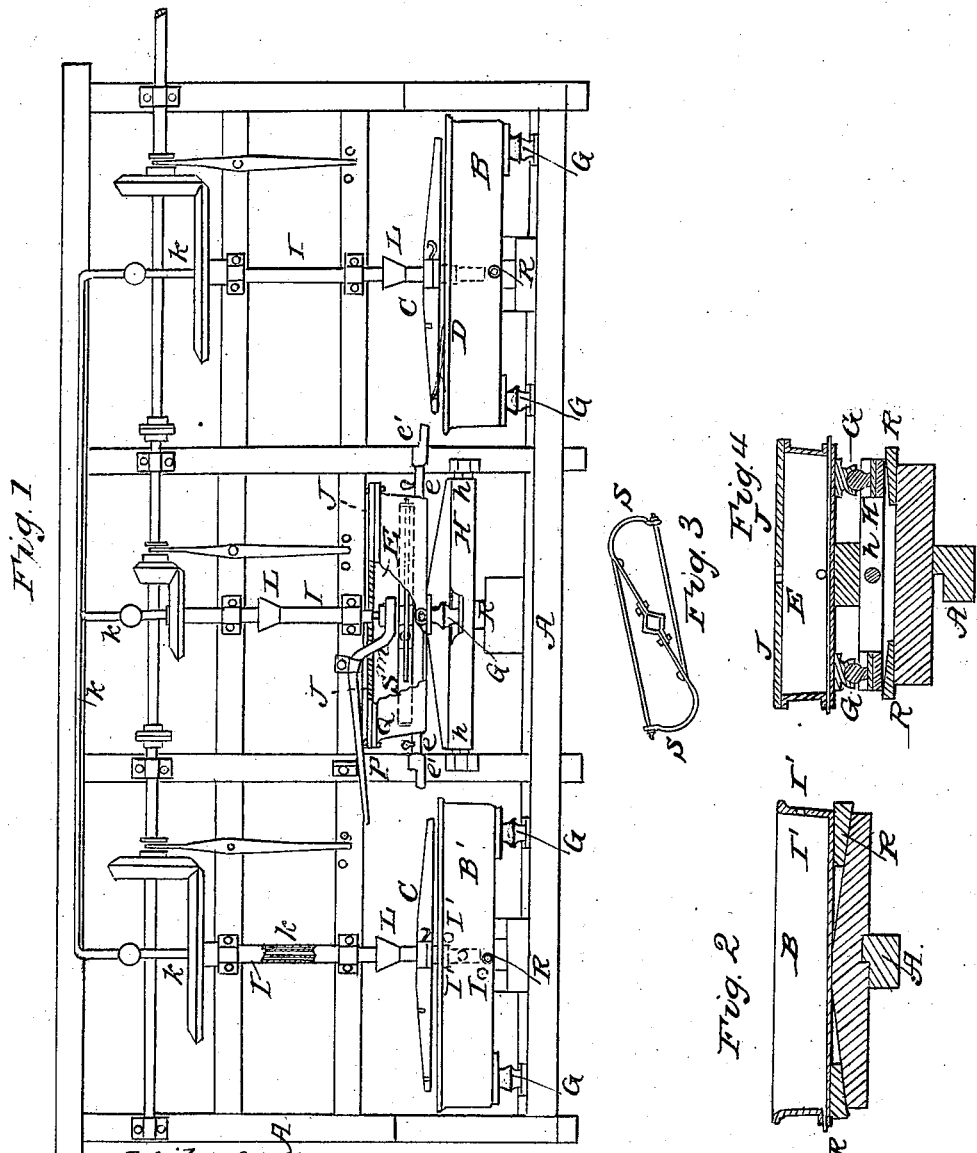

UNITED STATES PATENT OFFICE.

S. E. WOODWORTH AND J. S. WETHERED, OF SAN FRANCISCO, CALIFORNIA.

AMALGAMATOR.

Specification of Letters Patent No. 30,781, dated November 27, 1860.

*To all whom it may concern:*

Be it known that we, SELIM E. WOODWORTH and JAS. S. WETHERED, of the city and county of San Francisco and State of California, have invented a new and useful Apparatus for Treatment of Ores, called a "Separator and Amalgamator;" and we do hereby declare that the following is a full, clear, and exact description of the construction and operation of the same, reference being had to the annexed drawings, making a part of this specification.

A, is a frame work of wood; B, are cast iron pans for arrastre; C, are spider frames to which stone drags or mullers D, are attached; E is a pan set between the two arrastres B; $s$, is a scraper or agitator of the letter S, or comet shape. The arrastres and pans are furnished with ball and socket joints as shown at G, so as to allow them to be tipped.

As will be seen by the drawing, the pan E, tips upon the ball and socket joint so as to discharge its contents through the pipes $e$, into either arrastre, as may be desired, or the platform H, upon which the pan rests, may be tilted to the front or rear upon its axis $h$, so that the contents of the pan, may be discharged in any desired direction. When the pan is to be tilted, the scraper or agitator S, should be raised by means of the lever $m$. The stone drags D, of the arrastre, and the scraper or agitator S, in the pan E, are set in motion, when required, by upright hollow shafts I, driven by proper shafting and gearing. A steam or water pipe, or a pipe to be used for both purposes, is represented by $k$, as passing through the shafts I, to the center and bottom of the arrastre and pan.

L, are cups upon the shafts I, to be filled with any alkaline substance, for neutralizing the oil or grease used for lubricating, and preventing the same from falling into the arrastres or pans.

$e'$, are sliding sleeves upon the pipes $e$, at each side of the pan E, toward the arrastre. The shaft of the pan E, should be so geared as to make two or more revolutions while the shafts of the arrastre are making one revolution each.

Operation: The pan E, should be filled to a proper depth, with a liquid in a boiling state, the scraper $s$, should then be set in motion, pulverized ore should be put in the pan till the mass is of a proper consistency, the pan is then covered and steam turned on through pipe $k$. As soon as the mass is thoroughly saturated, mercury is added; at the end of an hour or more, according to the character of the ore under treatment, steam is then shut off, the covers are removed, one of the arrastres being in motion, the contents of the pan E, are drawn into it through the pipe $e$, (the sleeve $e'$, being drawn out so as to reach over the edge of the arrastre) when the contents of the pan are drawn off, the amalgam will be left in the bottom of the pan, this amalgam should then be withdrawn, and the mercury being expressed therefrom; the mercury so expressed is returned to the pan with another charge. As soon as the charge has been delivered into the arrastre, mercury is added as required, steam is admitted through pipe $k$, when desired, by the operator. The operation as above described is repeated alternately into each arrastre, till such time as the arrastre shall become sufficiently full.

The arrastre should be continued in motion for at least one hour after receiving its last charge before washing out, which is accomplished as follows, viz: a stream of clear water being admitted to the arrastre through its hollow shaft or otherwise, until the same is filled to the brim, the upper discharge hole I′, in rear of the arrastre is opened and the contents permitted to be discharged, so long as it runs in a discolored state, when the hole next below is opened, and the same process continued, and so on till nearly all the earthy matter is discharged, leaving the amalgam nearly free from extraneous matter, the amalgam is then withdrawn from the hole in front, and washed out in a pan.

The steam when introduced through the hollow shafts into the pans filled with pulverized ore or amalgam, produces a violent agitation of the contents of the pans which in combination with the action of the scraper S, in the pan E, and the mullers D, in the pans B, assists the rapid amalgamation of the quicksilver and the precious metal contained in the ore, in a highly effectual manner. At the same time the steam serves to heat the mass in the pans whereby certain volatile foreign substances such as sulfur, &c., are liberated and the mercury is expanded so as to increase its tendency to amalgamate. The steam not only spreads and scatters the quicksilver as well as the pulverized ore, by the force with which it issues from the hollow shaft, but at the same time the heat of the steam causes the mercury to rise in innumerable infinitesimal globules through the boiling water in the pan so as to catch the fine gold floating on the surface of the water. The steam being thus used in combination with the contents of amalgamating and separating pans, as a mechanical as well as chemical agent, assists the process of amalgamation and separation in a very powerful manner and the experiments of the inventors have proved that by using steam as above described, one half the time and expense is saved and a more thorough amalgamation and separation is obtained than by any other known method of stirring the mass and applying heat to the outer surface of the pans.

The pans B, B, and the frame H, which supports the pan E, can be confined in any suitable position by means of movable wedges R.

The holes I', as well as the different discharge tubes of the pans are provided with stoppers, stop cocks, or equivalent means for closing them when necessary.

J, J, are iron-plates which are to be placed on the pan E, and fastened by means of bolts screwed through the holes P, in the plates and holes Q, in the flange of the pan, for the purpose of keeping the pans covered while the steam is introduced into them.

Having described our invention what we claim therein as new and desire to secure by Letters Patent, is—

Introducing steam into the pans of an amalgamating and separating apparatus so as to bring it into direct contact with the ores, quicksilver, &c., contained in said pans, for the purposes above set forth.

S. E. WOODWORTH.
JAS. S. WETHERED.

Witnesses to S. E. Woodworth's signature:
FREDK. A. WOODWORTH,
CHAS. R. BOND.

Witnesses to Jas. S. Wethered's signature:
M. L. GRITZNER,
C. COHEN.